United States Patent
Fuhrmann et al.

(10) Patent No.: US 6,398,886 B1
(45) Date of Patent: Jun. 4, 2002

(54) METHOD AND DEVICE FOR COMPLETING OUTER JOINT ELEMENTS THAT ARE FORMED WITHOUT CUTTING

(75) Inventors: Peter Fuhrmann; Hans-Willi Kinzel, both of Lohmar (DE)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/719,453
(22) PCT Filed: Apr. 14, 2000
(86) PCT No.: PCT/EP00/03362
§ 371 (c)(1),
(2), (4) Date: Jun. 22, 2001
(87) PCT Pub. No.: WO00/63568
PCT Pub. Date: Oct. 26, 2000

(30) Foreign Application Priority Data

Apr. 16, 1999 (DE) .......................................... 199 17 386

(51) Int. Cl.[7] .............................. C21D 9/00; C21D 9/50; F16D 3/16; G01B 21/00
(52) U.S. Cl. ........................ 148/639; 148/572; 148/906; 464/145; 464/906; 73/1.79; 73/1.81
(58) Field of Search ................................. 148/906, 902, 148/572, 639; 464/145, 906; 73/1.79, 1.81

(56) References Cited

U.S. PATENT DOCUMENTS 5,501,639 A 3/1996 Krude
5,618,235 A 4/1997 Krude et al.
5,797,801 A 8/1998 Jacob

FOREIGN PATENT DOCUMENTS

| DE | 28 17 167 c3 | 7/1984 |
|---|---|---|
| DE | 31 32 363 C2 | 6/1990 |
| DE | 42 00 848 C1 | 6/1993 |
| JP | 63165039 | 7/1980 |
| JP | 59220240 | 12/1984 |
| JP | 61149616 | 7/1986 |
| JP | 5-26250 | 2/1993 |

*Primary Examiner*—Deborah Yee

(57) ABSTRACT

A process of finishing outer joint parts formed in a non-cutting way and intended for constant velocity joints, said outer joint parts having a longitudinal axis and an inner recess which extends in the direction of the longitudinal axis and which, in the direction of the longitudinal axis, is substantially undercut-free, with the inner recess being provided with tracks which comprise contact zones for the rolling contact of rolling contact members, characterized by the following sequence of process stages:

non-cutting forming of the outer joint part, surface-layer-hardening of the inner recess at least along the length of the contact zones, for the purpose of producing a hardened surface layer, at least in the region of the contact zones above an unhardened matrix, calibrating the contact zones in respect of their radial positions and axial linearity by displacing the hardened surface layer in the region of the contact zones within the unhardened matrix.

32 Claims, 5 Drawing Sheets

METHOD AND DEVICE FOR COMPLETING OUTER JOINT ELEMENTS THAT ARE FORMED WITHOUT CUTTING

The invention relates to a process of finishing outer joint parts formed in a non-cutting way and intended for constant velocity joints in the form of tripode joints or ball joints; the outer joint parts have a longitudinal axis and an inner recess which extends in the direction of the longitudinal axis and which is substantially undercut-free. The inner recess is provided with tracks for form-fittingly receiving rolling members which, in turn, are held in a form-fitting connection by the inner joint part. The tracks comprise hardened contact zones for the rolling contact of rolling members. Furthermore, the invention relates to a device for finishing outerjoint parts formed in a non-cutting way and intended for constant velocity joints of the above-mentioned type.

The invention relates to tripode joints and ball joints in the form of UF joints (undercut-free) and DO joints (double offset). For reasons of cost, the process of forming such joints in a non-cutting way is nowadays perfected to such an extent that the tracks with their respective roller contact zones (in the case of tripode joints) and ball contact zones (in the case of ball joints) comprise their finish dimension and do not require subsequent machining. It is, however, necessary to harden at least the contact zones on which the rolling members run, with such hardening usually being carried out in the form of induction hardening. In view of the axially asymmetric , conditions of mass and thermal capacity at the respective ends of the tracks, i.e. due to a relative heat accumulation at the axial ends of the contact zones to be hardened, the contact zones are subject to hardness distortions which cannot be perfectly compensated for, not even by an axially adapted introduction of heat and/or cooling during the hardening operation. In consequence, the contact zones, along their axial length, are radially distorted at their ends, and the internal dimension of the inner recess between symmetrically opposed contact zones at the axial ends of the outer joint part is normally reduced. Subsequent machining in the form of grinding is impossible for reasons of costs. As a result the joint suffers from tolerance defects with too close a fit at the open end of the outer joint part and/or too wide a fit in the rear inner region of the outer joint part.

It is therefore the object of the present invention to provide a process of and device for finishing outer joint parts of said type, which improve the dimensional accuracy of the hardened contact zones of the tracks and thus reduce the tolerance defects at the joint.

The objective is achieved by providing a process which is characterised by the following sequence of process stages:
  non-cutting forming of the outer joint part, surface-layer-hardening of the inner recess at least along the length of the contact zones, for the purpose of producing a hardened surface layer, at least in the region of the contact zones, above an unhardened matrix and
  calibrating the contact zones in respect of their radial positions and axial linearity by displacing the hardened surface layer in the region of the contact zones within the unhardened matrix.

By leaving a non-calibrated surface strip between each two surface-layer-hardened, calibrated contact zones, it is possible to sufficiently deform the hardened contact zones with the matrix or within the matrix without there occurring any fractures of the hardened contact zones. It is particularly advantageous if, while calibrating the contact zones, the unhardened matrix behind the hardened surface layer is made to flow over large portions, starting from the outer surface of the component; circumferential movements in the matrix should also be permitted. Flowing in the matrix, which occurs by generating an inwardly directed pressure on the outer surface of the component should take place in those cases where the internal dimension of the inner recess between opposed contact zones has to be reduced and also in those cases where said internal dimension has to be increased. The hardened surface layer can be produced with a thickness of up 1.2 mm. The stresses necessarily occurring within the hardened calibrated strips of the surface layer can be reduced by a subsequent heat treatment without incurring a substantial loss of hardness. If the radial dimension of the inner recess between opposed hardened contact zones is too small after hardening, especially at the axial end of the outer joint part, it can be increased by pressing in strips of (hardened) surface layers into the matrix. If, on the other hand, the radial dimension of the inner recess between opposed hardened contact zones is too large after hardening, it can be reduced by pressing in the matrix material behind the strip of the (hardened) surface layers. Both measures are effected by axially pressing a calibrating mandrel into the outer joint part in a first process stage and by radially pressing outer calibrating jaws on to the outer joint part in a second process stage while the calibrating mandrel is in an introduced condition. Both measures can be carried out jointly in one calibrating operation in different regions of the contact zones.

According to a first variant in accordance with the invention, there is proposed a process having the following process stages:
  non-cutting forming of the outer joint part,
  surface-layer-hardening of the inner recess along the length of the contact zones while
  producing a hardened surface layer in the region of the contact zones above an unhardened matrix, and retaining an unhardened surface strip between the adjoining contact zones,
  calibrating the contact zones in respect of their radial positions and axial linearity by displacing the hardened surface layer in the region of the contact zones within the unhardened matrix.

Between each two surface-layer-hardened contact zones there is retained a surface strip in which the unhardened matrix forms the inner face of the inner recess. This permits high deformation rates, and the internal dimension of the inner recess between two symmetrically opposed contact zones can be changed by up to 0.3 mm.

If the inventive method is applied to the outer parts of tripode joints which comprise three inner longitudinally extending roller tracks which each comprise pairs of symmetrically arranged roller contact zones, it is proposed that between the roller contact zones of one roller track, there is retained an unhardened strip of the matrix and, according to a preferred embodiment, that between adjoining roller contact zones of two adjoining roller tracks, there is retained an unhardened strip of the matrix. If the inventive method is applied to the outer parts of ball joints which comprise at least three longitudinally extending ball grooves which form pairs of symmetrically arranged ball contact zones, it is proposed that between adjoining ball contact zones of two adjoining ball grooves, there is retained an unhardened strip of the matrix. In such a case, either the surface layer of an entire ball groove is completely hardened or it can be proposed that between the two ball contact zones of a ball groove, there is also retained an unhardened strip of the matrix. In both cases, the two ball contact zones of a ball groove can be deformed relative to one another.

According to a second variant in accordance with the invention, there is proposed a process having the following process stages:

non-cutting forming of the outer joint part, surface-layer-hardening of the inner recess along the length of the contact zones, thereby producing a hardened surface layer which is continuously hardened in the inner recess, above an unhardened matrix, calibrating the contact zones in respect of their radial positions and axial linearity by displacing the hardened surface layer in the region of the contact zones within the unhardened matrix.

In this case, the inner surface of the inner recess is surface-layer-hardened all around in a simplified way. As a result, when calibrating the contact zones, the intermediate surface-layer-hardened regions are subject to stresses which must not lead to an uncontrolled formation of cracks. The deformation rates in this case are slightly limited, and the internal dimension of the inner recess between two symmetrically opposed contact zones can be changed by up to 0.2 mm. Any stresses can be reduced after the calibration process by heat treatment.

If the inventive method is used for the outer joint parts of tripode joints which comprise three longitudinally extending roller tracks which each comprise pairs of symmetrically arranged roller contact zones, it is proposed that between the calibrated roller contact zones of a roller track, there are retained non-calibrated strips each, and in a further preferred embodiment it is proposed that between adjoining calibrated roller contact zones of adjoining roller tracks, there are retained non-calibrated strips each. This is achieved in that, in these areas, the component wall is not subjected to any process operations, neither from the inside nor from the outside. It the inventive method is applied to the outer parts of ball joints which comprise at least three longitudinally extending ball grooves which each form pairs of symmetrically arranged ball contact zones, it is proposed that between the two ball contact zones of a ball groove, there are retained largely non-calibrated strips each. In addition, it is proposed that between adjoining calibrated ball contact zones of two adjoining ball grooves, there are retained largely non-calibrated strips each. This is achieved in that, in these areas, the component wall is not subjected to any joint process operations, neither from the inside nor from the outside. In any case, the two ball contact zones of a ball groove can be deformed relative to one another.

According to a preferred embodiment it is proposed that calibration takes place by pressure-agent-operated tools and that the calibration process is controlled by regulating and limiting the pressure of the pressure agent. As a result, any scatter as regards the starting dimension of the workpiece, especially also at the outer circumference of the outer joint part, is of no significance.

A device for carrying out the above-explained method is characterised by a rigid calibrating mandrel—especially with a straight, non-round cylindrical member—which can be axially introduced into the outer joint part, and by a number of calibrating jaws which at least corresponds to the number of tracks—especially with straight, non-round cylindrical faces—which can be radially moved to the calibrating mandrel and whose radial dividing planes are positioned symmetrically between two hardened contact zones to be calibrated.

As a result, the calibrating mandrel and the calibrating jaws, in the region of their effective faces, comprise parallel mantle lines whose purpose it is to co-operate by producing correspondingly parallel mantle lines on the contact faces. At its end which has to be introduced first into the outer joint part, the calibrating mandrel can be provided with large introducing radii.

According to a further preferred embodiment, it has to be ensured that in the case of tripode joints, there have to be provided six calibrating jaws, which number corresponds to the number of hardened contact zones. In the case of ball joints, a number of calibrating jaws corresponding to the number of ball grooves can be sufficient. As already indicated above, the calibrating mandrel is first introduced into an axially held outer joint part; this can take place with play, or parts of the hardened contact zones can already be radially displaced while being introduced, and straightened under plastic deformation of the matrix. During the subsequent process stage, the calibrating jaws are radially fed in and in the process, the outer joint part is deformed in such a way that plastic deformation of the matrix behind the hardened tracks takes place to such extent that the hardened contact zones rest against the calibrating mandrel with approximately an equal amount of pre-pressure.

In order to permit a sufficient degree of plastic deformation of the matrix, the calibrating mandrel is provided with supporting zones for the hardened roller contact zones or ball contact zones and forms intermediate clearance cuts which, up to the completion of the calibrating operation, remain contact-free relative to the inner surface of the outer joint part. For the same purpose it is proposed that the calibrating jaws comprise longitudinally extending pressure ribs and intermediate clearance cuts into which material can flow during plastic deformations but contact between the outer face of the outer joint part and the regions of the clearance cut is permitted. In any case, displaced material can enter the region of the dividing planes between two calibrating jaws. Even at the end of the calibrating operation, two calibrating jaws remain at a circumferential distance between the dividing planes.

The calibrating jaws are preferably received in a supporting ring in which they are radially displaceable, and the radial displacement can be achieved by fixed wedges and sliding wedges co-operating with one another. The calibrating jaws and an inserted outer joint part are placed on to a supporting plate of a counter punch, the calibrating mandrel connected to an upper punch is introduced and one punch face at the calibrating mandrel is lowered on to the sliding wedges. The pressurised counter punch is able to give way, together with the calibrating jaws and the outer joint part, so that a sliding movement can take place only between the sliding wedges and the fixed wedges, whereas the sliding wedges can move relative to the calibrating jaws and the outer joint part in the radial direction only. When a predetermined pressure differential is achieved between the punch and counter punch, the calibrating process is completed.

According to a further preferred embodiment, holding-down devices displaceable in guiding means are arranged on the upper face of the supporting ring.. After the calibrating process has been completed, the holding-down devices are moved across the end face of the outer joint part and the calibrating mandrel is withdrawn.

A preferred embodiment of an inventive device will be explained in greater detail below with reference to the drawings wherein FIG. 1 shows an upper tool with the calibrating punch in a vertical section.

Figure 1:
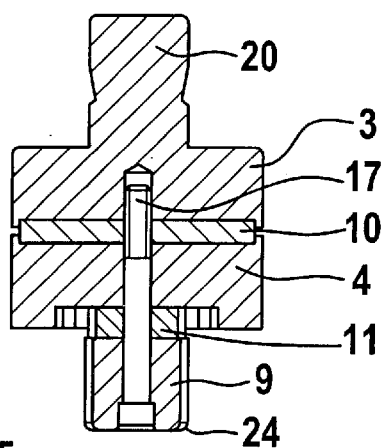
Figure 2:
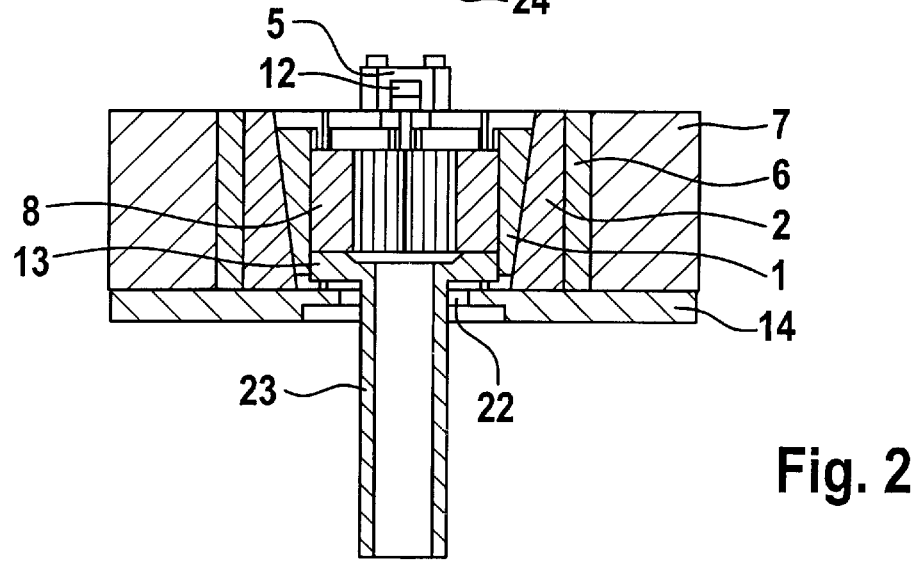
FIG. 2 shows a lower tool with the calibrating jaws in a vertical section.
Figure 3:
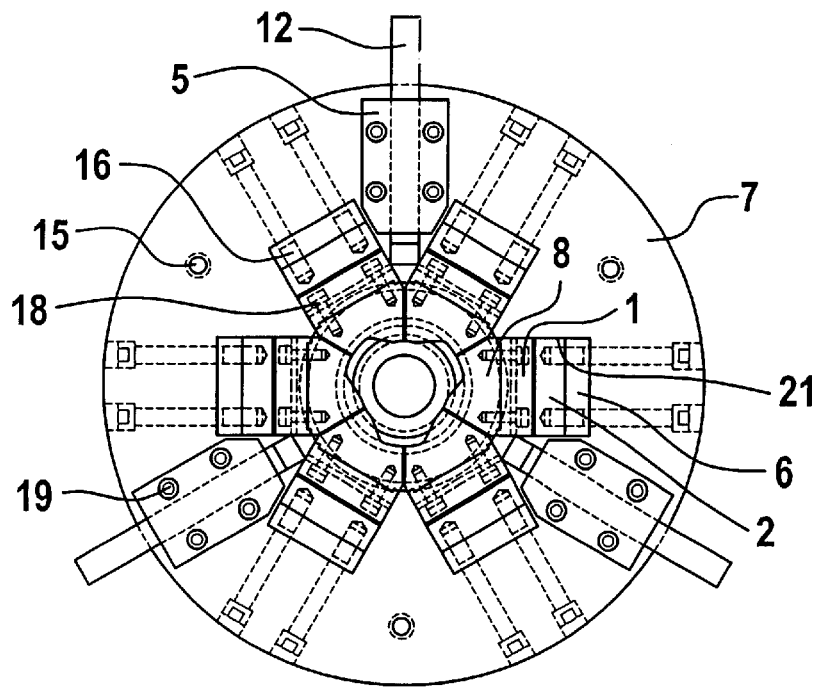
FIG. 3 shows the lower tool in a plan view.

FIGS. 1 to 3 will be described jointly below. In an upper punch 3, which has to be secured by a journal 20 to a machine punch, there is secured a calibrating mandrel 9 by means of a bolt 17. The upper punch 3 carries a pressure plate 4 which is supported on the upper punch 3 by means of a plate 10 and on which the calibrating mandrel 9, in turn, is supported via a disc 11. At its free end, the calibrating mandrel 9 comprises large introducing radii 24. In a supporting ring 7, there is formed a number of radial grooves 21 which are closed at their lower ends by a base plate 14. The base plate 14 comprises a central opening 22. The counter punch 13 is positioned inside the supporting ring 7 which, by means of a sleeve projection 23, projects downwardly through the opening 22. In the radial grooves 21 in the supporting ring 7 there are arranged backing pieces 6 and fixed wedges 2 which rest on the base plate 14 and are bolted to the supporting ring 7. Into the fixed wedges 2 there are inserted sliding wedges 1 which, when lowering the upper punch 3 on to the supporting ring 7, can be displaced by the pressure plate 4. The sliding wedges 1 radially act on calibrating jaws 8 which rest on the counter punch 13 which is resiliently supported. The calibrating mandrel 9 substantially corresponds to the inner shape of the calibrated outer joint part which is inserted between the calibrating jaws 8. The calibrating jaws 8, together, complement one another to form the outer shape of the outer joint part. An outer joint part is inserted from the opening end upwardly into the supporting ring 7 between the calibrating jaws 8, and an adjoining joint journal can be inserted into the sleeve projection 23 at the counter punch 13. The upper punch 3 is lowered, so that the calibrating mandrel 9 penetrates the outer joint part until the end face of the pressure plate 4 rests on the upper faces of the sliding wedges 1. When the upper punch 3 is moved further, the sliding wedges 1 slide downwards, together with the calibrating jaws 8 and the counter stamp 13. In the process, the sliding wedges 1 are pressed radially inwardly along the co-operating inclined faces of the sliding wedges 1 and fixed wedges 2, so that the calibrating jaws 8 press the outer joint part from the outside on to the calibrating mandrel 9. The Figures show the inner end position of the calibrating jaws 8. The sliding wedges 1 still comprise a small amount of radial play relative to the outer circumference of the counter punch 13. Guiding means 5 in which there are guided radially displaceable holding-down devices 12 are bolted on to the supporting ring 7. After completion of the calibrating process, said holding-down devices 12 are moved radially inwardly and rest on the end face of the outer joint part. Thereafter, the calibrating mandrel 9 is removed from the upper punch 3, with the outer joint part being held back by the holding-down devices 12 between the calibrating jaws 8.

Figure 4:
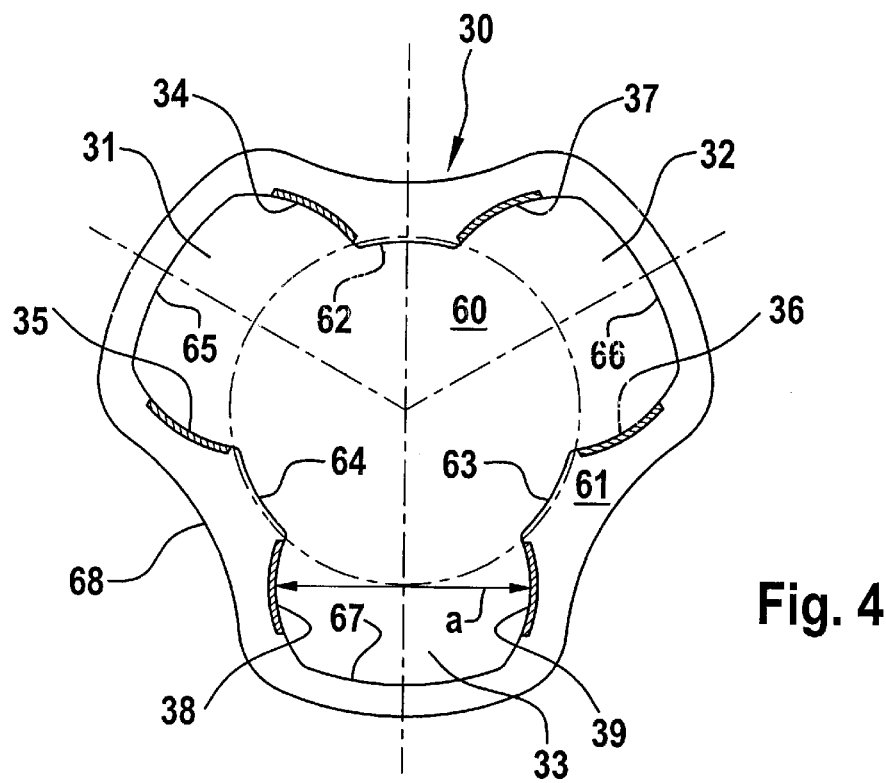
FIG. 4 shows a cross-section through an outer joint part of a tripode joint with hardened contact regions separated by unhardened matrix regions.

FIG. 4 is a cross-section of an outer joint part of a tripode joint. In the inner recess 60 of said outer joint part there are marked three tracks 31, 32, 33 each having two roller contact zones 34, 35, 36, 37, 38, 39.

The roller contact zones 34, 35, 36, 37, 38, 39 are formed by hardened surface layers of a small thickness within a matrix 61 consisting of an unhardened material. Between roller contact zones of adjoining tracks 31, 32, 33 and also between pairs of roller contact zones 34,/35, 36/37, 38/39 inside each track, the material of the matrix forms unhardened longitudinal strips 62, 63, 64, 65, 66, 67 of the surface of the inner recess. The unhardened material of the matrix extends as far as the outer surface 68.

Two roller contact zones 34/35, 36/37, 38/39 positioned opposite one another in one of the tracks 31, 32, 33 establish contact with one of the tripode rollers of the inner joint part of the tripode joint. Said pairs of roller contact zones form an internal dimension a which has to be constant along the entire axial length of the tracks; this is achieved by the calibrating process in accordance with the invention.

Figure 5:
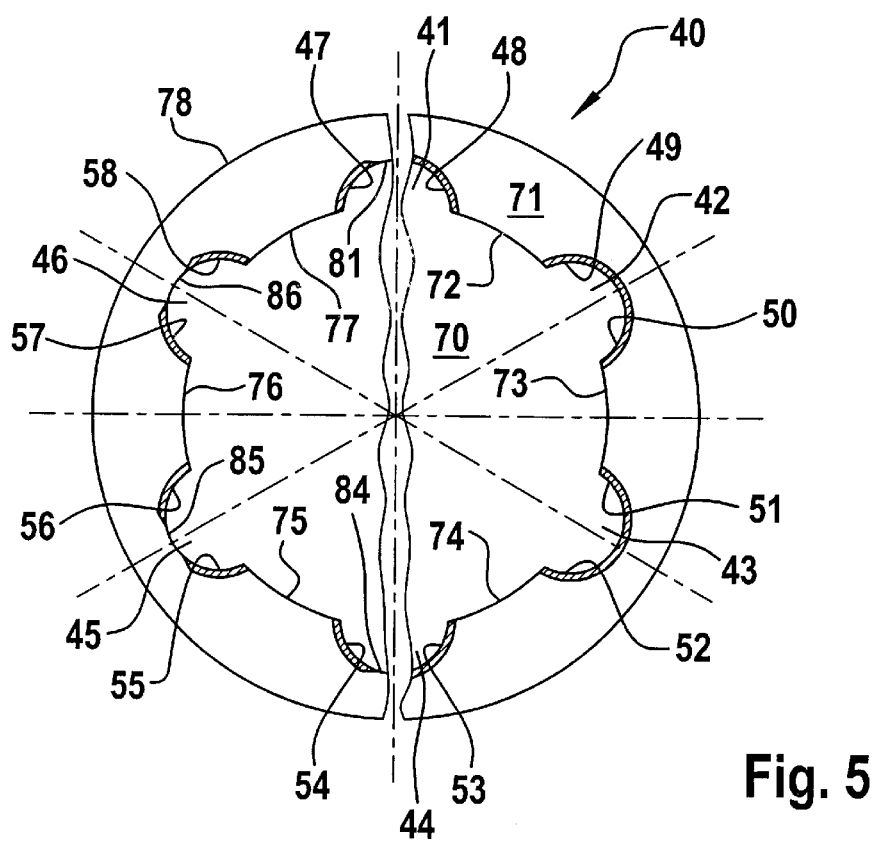
FIG. 5 shows a cross-section of an outer joint part of a ball joint with hardened contact regions separated by unhardened matrix regions.

FIG. 5 shows an outer joint part of a ball joint 40 with an inner recess 70 with six ball grooves 41–46. In each ball groove, there are marked two contact zones 47–58 which establish contact with the balls which are held in the same way in the ball grooves of the outer joint part and in the ball grooves of the inner joint part. The ball contact zones are formed by hardened surface layers of a small thickness within a matrix of unhardened material. Between the ball contact zones of adjoining ball grooves, the material of the matrix forms unhardened longitudinal strips 72, 73, 74, 75, 76. The unhardened material of the matrix 71 extends as far as the outer surface 78. In the lefthand half of the Figure, the contact zones 47, 54–58 are hardened independently of one another in the individual ball grooves as narrow surface layers. In the ball tracks 41, 44–46 it is possible to identify the unhardened longitudinal strips 81, 84–86 which separate the contact zones. In the righthand half of the Figure, each complete ball groove forms a hardened zone in which each hardened surface layer comprises two contact zones 48–53.

Figure 6:
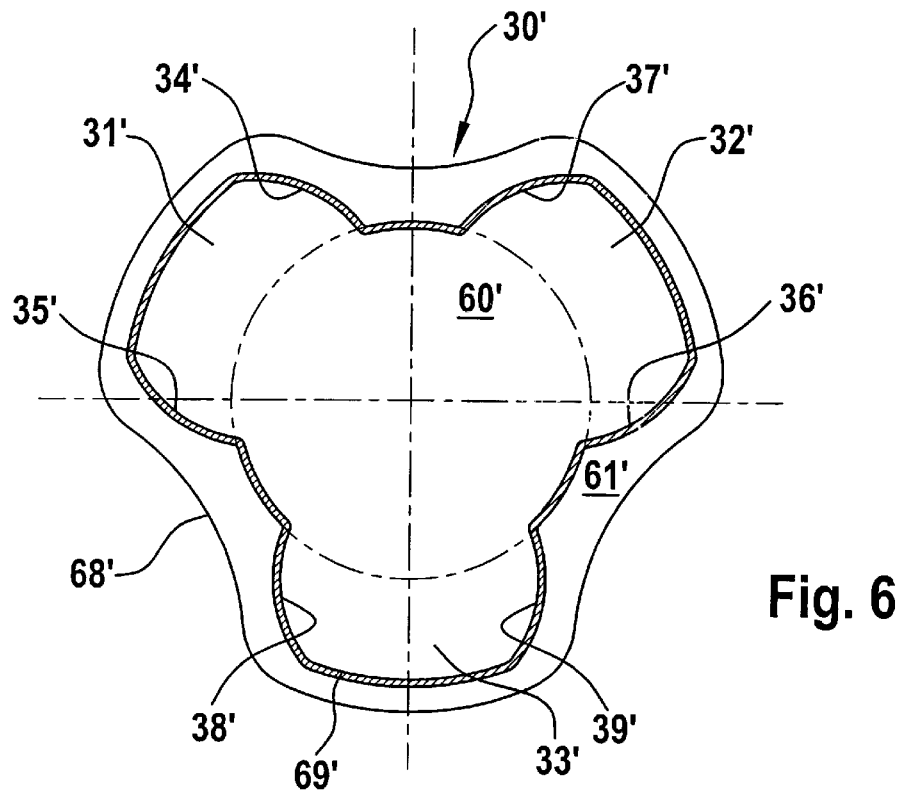
FIG. 6 shows a cross-section of an outer joint part of a tripode joint with contact regions positioned within a continuously hardened surface layer.

FIG. 6 shows an outer joint part 30' of a tripode joint whose shape substantially corresponds to that shown in FIG. 4. Corresponding details have been given the same reference number with an added index ('). The inner recess 60', however, comprises a continuous hardened surface layer 69' within which the tripode contact zones 34'–39' are positioned. There are thus no unhardened strips in the inner recess 60'. In this case, too, the material of the matrix 61' extends as far as the outer surface 68'.

Figure 7:
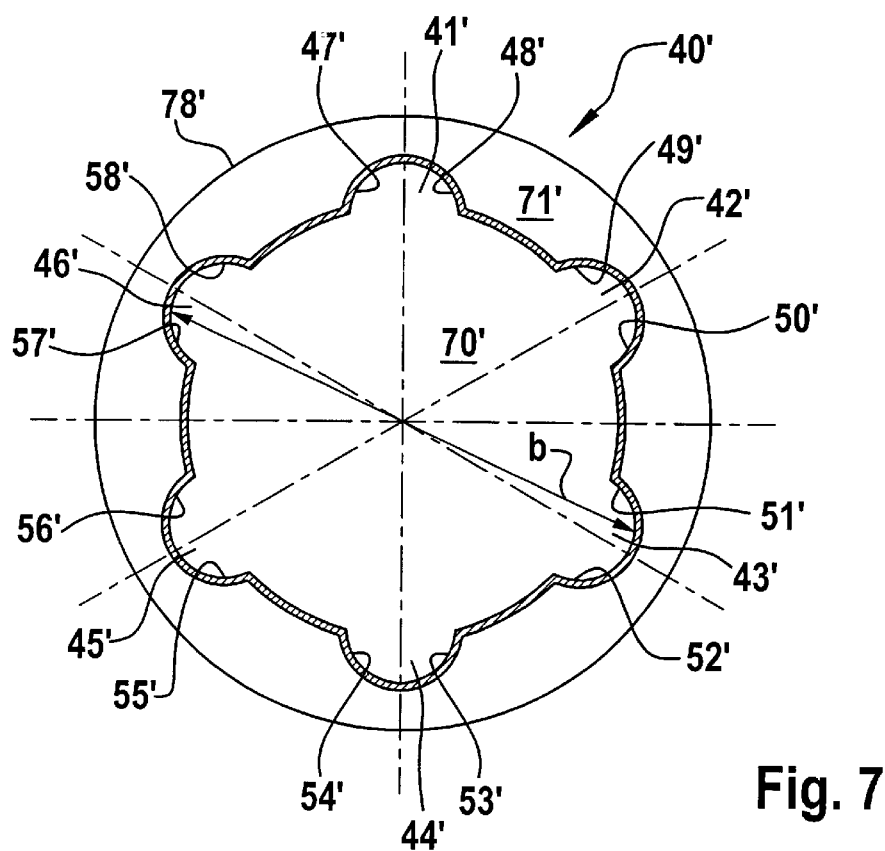
FIG. 7 shows a cross-section of an outer joint part of a ball joint with contact regions positioned within a continuously hardened surface layer.

FIG. 7 shows an outer joint part 40' of a ball joint whose shape substantially corresponds to that shown in FIG. 5. Corresponding details have been given the same reference number with an added index ('). However, the inner recess 70' comprises a continuous hardened surface layer 79'. There are thus no unhardened strips in the inner recess 70'. The material of the matrix 71' extends as far as the outer surface 78'. The dimension b refers to the internal dimension between two symmetrically opposed contact zones; it has to be constant along the entire axial length of the tracks. This is achieved by the calibrating process in accordance with the invention.

Figure 8:
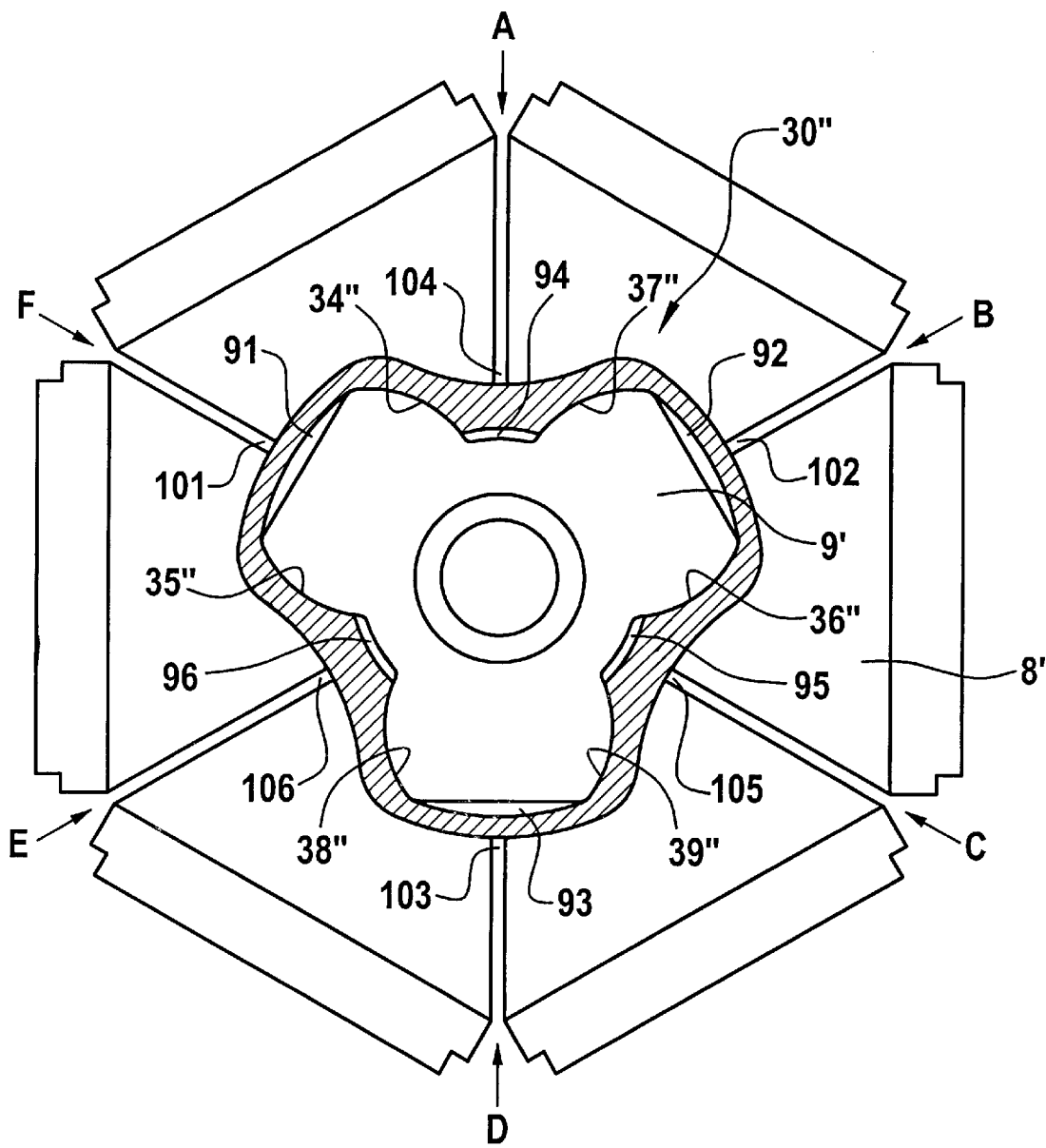
FIG. 8 shows a cross-section of a device for calibrating the outer joint part of tripode joints with a clamped-in workpiece during the calibrating operation.

FIG. 8 shows a cross-section of six calibrating jaws 8' and a standard calibrating mandrel 9' for an outer joint part 30" of a tripode joint. Such an outer joint part 30" of a tripode joint is shown during the calibrating process. It can be an outer joint part according to FIG. 4 where only contact regions are hardened or it can be an outer joint part according to FIG. 6 with a continuously hardened surface layer. During the calibrating operation, the calibrating mandrel 9' establishes contact with the roller contact zones 34"–39" whereas it forms first free spaces 91, 92, 93 with the surface of the inner recess in the head regions of the individual tracks and second free spaces 94, 95, 96 between each two tracks relative to the inner surface of the inner recess. The cross-section of the calibrating mandrel corresponds to the contour of an inner part of a tripode joint with fitted tripode rollers. The dividing planes A–F between the calibrating jaws 9' are positioned so as to be associated with said free spaces 91–96, i.e. centrally between two roller contact zones 34"–39" to be calibrated, and form further free spaces 101–106. Regardless of whether the tracks are widened or reduced in width during calibration, matrix material can flow inwardly and outwardly into said free spaces 91–96, 101–106, so that all of the material behind the hardened surface layers is made to flow.

Figure 9:
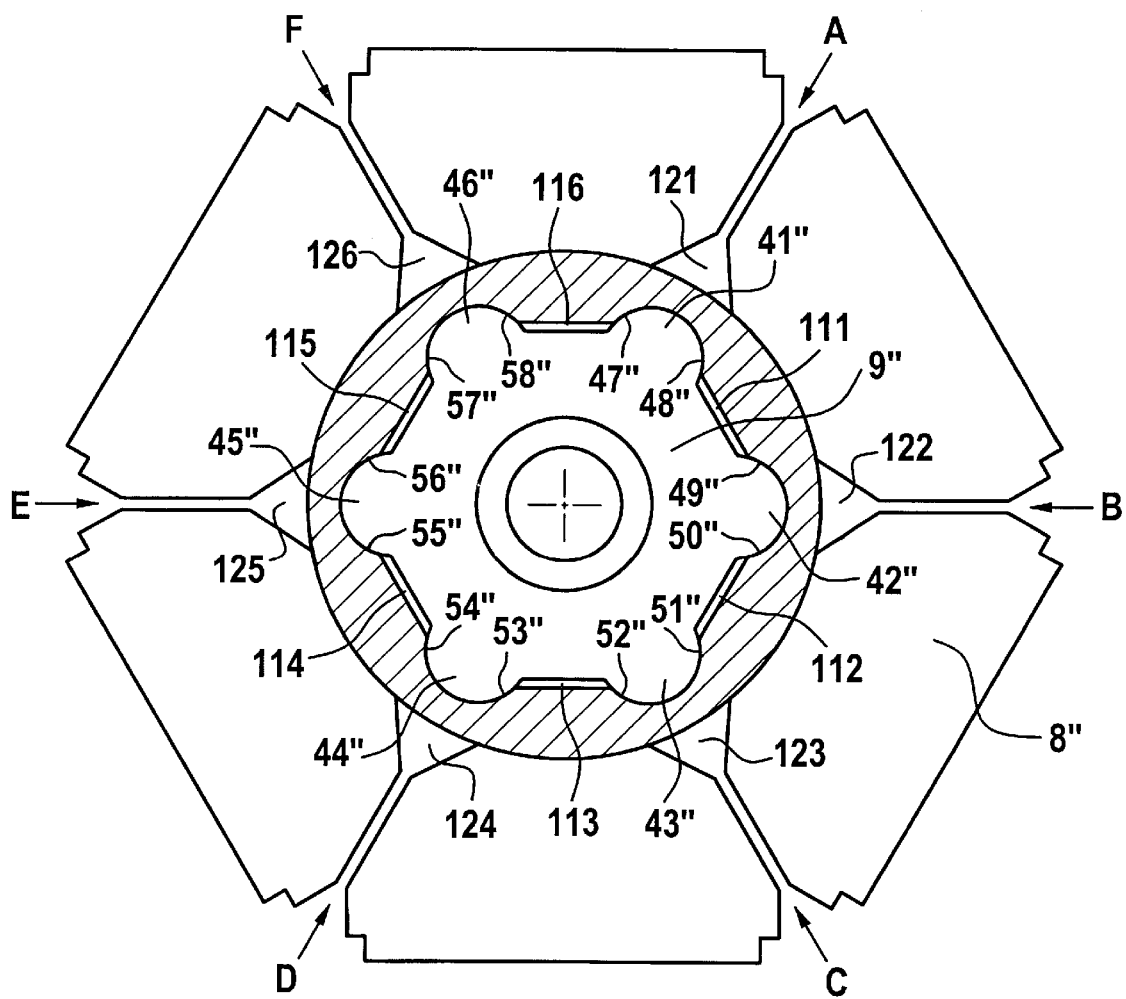
FIG. 9 is a cross-section through a device for calibrating the outer joint part of ball joints with a clamped-in workpiece during the calibrating operation.

FIG. 9 shows a cross-section through six calibrating jaws 8" and a standard calibrating mandrel 9" for the outer joint part 40" of a ball joint with six, ball tracks. Such an outer joint part 40" of a ball joint is shown during calibration. It can be an outer joint part according to FIG. 5 where only the contact regions are hardened or it can be an outer joint part according to FIG. 7 with a, continuously hardened surface layer. The calibrating mandrel 9" establishes contact with the ball contact zones 47"–58" during the calibration process,, whereas it forms free spaces 111, 112, 113, 114, 115, 116 with the outer surface of the inner recess between each two ball grooves relative to the inner surface of the inner recess. The cross-section of the calibrating mandrel approximately corresponds to the contour of an inner joint part with a fitted ball cage and balls inserted into same. The dividing planes A–F between the calibrating jaws 8" are positioned so as to be associated with the ball grooves 41"–48" between each two free spaces 111–116, i.e. centrally between two ball contact zones 47"–58" to be calibrated and form further free spaces 121–126. Regardless of whether the tracks are widened or reduced in width during the calibrating operation, matrix material can flow inwardly and outwardly into said free spaces 111–116, 121–126, so that the entire material behind the hardened surface layers is made to flow.

LIST OF REFERENCE NUMBERS 1 sliding wedge
2 fixed wedge
3 upper punch
4 pressure plate
5 guiding means
6 backing piece
7 supporting ring
8 calibrating jaw
9 calibrating mandrel
10 plate
11 disc
12 holding-down device
13 counter punch
14 base plate
15 bolt
16 bolt
17 bolt
18 bolt
19 bolt
20 journal
21 radial groove
22 radial groove
23 sleeve projection
24 introducing radius
30 outer joint part of tripode joint
31–33 track
34–39 roller contact zone
40 outer joint part of ball joint
41–46 ball groove
47–58 ball contact zone
60 inner recess
61 matrix
62–67 longitudinal trips
68 outer surface
69 surface layer
70 inner recess
71 matrix
72–77 longitudinal strips
78 outer surface
79 surface layer
80 longitudinal strips
84–86 longitudinal strips
91–96 free s pace
101–106 free space
111–116 free space
121–126 free space

What is claimed is:

1. A method of finishing outer joint parts for constant velocity joints formed in a non-cutting way, said outer joint parts having a longitudinal axis and an inner recess which extends in the direction of the longitudinal axis and which, in the direction of the longitudinal axis, is substantially undercut-free, with the inner recess being provided with tracks which comprise contact zones for the rolling contact of rolling members, the method comprising the following steps:

non-cutting forming the outer joint part;
surface-layer-hardening the inner recess at least along the length of the contact zones, for the purpose of producing a hardened surface layer, at least in the region of the contact zones, above an unhardened matrix; and
calibrating the contact zones in respect of their radial positions and axial linearity by displacing the hardened surface layer in the region of the contact zones within the unhardened matrix.

2. A method according to claim 1, wherein, during the step of calibrating the contact zones, the unhardened matrix behind the surface hardened layer is made to flow.

3. A method of finishing outer joint parts for constant velocity joints formed in a non-cutting way, said outer joint parts having a longitudinal axis and an inner recess which extends in the direction of the longitudinal axis and which, in the direction of the longitudinal axis, is substantially undercut-free, with the inner recess being provided with tracks which comprise contact zones for the rolling contact of rolling members, the method comprising the following steps:

non-cutting forming the outer joint part;
surface-layer-hardening the inner recess along the length of the contact zones while producing a hardened surface layer in the region of the contact zones above an unhardened matrix, and retaining unhardened surface strips between the adjoining contact zones; and
calibrating the contact zones in respect of their radial positions and axial linearity by displacing the hardened surface layer in the region of the contact zones within the unhardened matrix.

4. A method according to claim 3 wherein a radial dimension of the inner recess between opposed contact zones is increased by outwardly pressing the hardened surface layer into the unhardened matrix, while at the same time, the unhardened matrix is flowing behind the hardened surface layer.

5. A method according to claim 3 wherein a radial dimension of the inner recess between opposed contact zones is reduced by subsequently pressing the unhardened matrix behind the hardened surface layer inwardly, while supporting the contact zones from the inside.

6. A method according to claim 3 for outer joint parts of tripode joints, wherein the inner recess comprises three longitudinally extending roller tracks which each comprise pairs of symmetrically arranged roller track flanks with contact zones for rollers, wherein, between the two hardened contact zones for the rollers of a roller track, there is retained an unhardened strip.

7. A method according to claim 6 wherein between adjoining hardened contact zones for rollers of two adjoining roller tracks, there is retained an unhardened strip.

8. A method according to claim 3 for the outer joint parts of ball joints, wherein the inner recess comprises at least three longitudinally extending ball grooves which each comprise pairs of symmetrically arranged ball track flanks with contact zones for balls, wherein between adjoining hardened contact zones for balls of two adjoining ball grooves, there is retained an unhardened strip.

9. A method according to claim 8 wherein between the two hardened contact zones for balls of a ball groove, there is left an unhardened strip.

10. A method according to claim 3 wherein the step of calibrating takes place with pressure-agent-operated tools and the calibration process is controlled by regulating and limiting the pressure of the pressure agent.

11. A method of finishing outer joint parts for constant velocity joints formed in a non-cutting way, said outer joint parts each having a longitudinal axis and an inner recess which extends in the direction of the longitudinal axis and which, in the direction of the longitudinal axis, is substantially undercut-free, with the inner recess being provided with tracks which comprise contact zones for the rolling contact of rolling members, the method comprising the following steps:
 non-cutting forming the outer joint part;
 surface-layer-hardening the inner recess along the length of the contact zones, thereby producing a hardened surface layer which is provided continuously in the inner recess, above an unhardened matrix; and
 calibrating the contact zones in respect of their radial positions and axial linearity by displacing the hardened surface layer in the region of the contact zones within the unhardened matrix.

12. A method according to claim 11 wherein a radial dimension of the inner recess between opposed contact zones is increased by pressing the hardened surface layer outwardly into the unhardened matrix, while at the same time, the unhardened matrix behind the hardened surface layer is flowing.

13. A method according to claim 11 wherein a radial dimension of the inner recess between opposed contact zones is reduced by subsequently pressing the unhardened matrix behind the hardened surface layer inwardly, while supporting the contact zones from the inside.

14. A method according to claim 11 for the outer joint parts of tripode joints, wherein the inner recess comprises three longitudinally extending roller tracks which each comprise pairs of symmetrically arranged roller track flanks with contact zones for rollers wherein between each two contact zones for the rollers of a roller track, there is retained a non-calibrated strip.

15. A method according to claim 14 wherein between adjoining contact zones for the rollers of two adjoining roller tracks, there is retained a non-calibrated strip.

16. A method according to claim 11 for outer joint parts of ball joints, wherein the inner recess comprises at least three longitudinally extending ball grooves which each comprise pairs of symmetrically arranged ball track flanks with contact zones for balls, wherein between adjoining contact zones for the balls of two adjoining ball grooves, there is retained a non-calibrated strip.

17. A method according to claim 16 wherein between the two contact zones for the balls of a ball groove, there is retained a non-calibrated strip.

18. A method according to claim 11 wherein the step of calibrating is effected by pressure-agent-operated tools and the calibration process is controlled by regulating and limiting the pressure of the pressure agent.

19. A method according to claim 1 wherein there is produced a hardened surface layer with a maximum thickness of 1.2 mm.

20. A method according to claim 3 wherein the surfaces of two symmetrically opposed contact zones are removed from one another or made to approach one another by a maximum amount of 0.3 mm.

21. A method according to claim 11 wherein the surfaces of two symmetrically opposed contact zones are removed from one another or made to approach one another by a maximum amount of 0.2 mm.

22. A device for finishing outer joints parts for constant velocity joints formed in a non-cutting way, said outer joint parts having a longitudinal axis and an inner recess which extends in the direction of the longitudinal axis and which, in the direction of the longitudinal axis, is substantially undercut-free, with the inner recess being provided with tracks which comprise hardened contact zones for the rolling contact of rolling contact members, the device comprising:
 a rigid calibrating mandrel (9) which can be axially introduced into the outer joint part; and
 a number of calibrating jaws (8) which at least corresponds to the number of tracks, which calibrating jaws (8) can be radially moved to the calibrating mandrel and whose radial dividing planes are positioned symmetrically between two hardened contact zones.

23. A device according to claim 22 wherein a number of calibrating jaws (8) corresponds to the number of hardened contact zones or to half the number of hardened contact zones.

24. A device according to claim 22 for calibrating the outer joint parts of tripode joints, wherein the inner recess comprises three longitudinally extending roller tracks which each comprise pairs of symmetrically arranged roller track flanks with contact zones for rollers, wherein the calibrating mandrel (9'), in respect of its cross-section, is copied to match a tripode star with rollers secured thereon and, in the head region of the tripode arm contour, forms first free spaces (91, 92, 93) relative to the outer joint part (30") and between the tripode roller contours second free spaces (94, 95, 96) relative to the outer joint part (30" ) and that there are provided six calibrating jaws (8') whose radial dividing planes (A–F) are arranged symmetrically relative to the individual free spaces (91–96) and form further free spaces (101–106).

25. A device according to claim 22 for calibrating the outer joint parts of ball joints, wherein the inner recess comprises at least three longitudinally extending ball grooves which each comprise pairs of symmetrically arranged ball track flanks with contact zones for balls, wherein the calibrating mandrel (9"), in respect of its cross-section, is copied to match an inner joint part with cage and balls inserted into same and, in the region of the cage contour between the balls, forms free spaces (111–116) relative to the outer joint part (40") and that there is provided a number of calibrating jaws (8") which corresponds to the number of ball grooves, with the radial dividing planes (A"–F") of the calibrating jaws (8") being arranged symmetrically between the two contact zones of the individual ball grooves and thus symmetrically between adjoining free spaces (111–116), while forming further free spaces (121–126).

26. A device according to claim 22 wherein the calibrating mandrel (9) comprises supporting zones for the hardened contact zones and intermediate clearance cuts which, up to the completion of the calibrating operation, remain contact-free relative to the surface of the inner recess of the outer joint part.

27. A device according to claim 22 wherein the calibrating jaws (8) each comprise pressure strips which are positioned behind the hardened contact zones and provide early contact with the outer joint part, as well as adjoining or intermediate clearance cuts which, at most, establish contact with the outer surface of the outer joint part at a later stage.

28. A device according to claim 22 wherein the calibrating jaws (8) are held in a supporting ring (7) and are radially displaceable relative thereto.

29. A device according to claim 28 wherein the calibrating jaws (8) are displaced by sliding wedges (1) which are axially displaceable relative to the supporting ring (7) and which are supported on fixed wedges (2) which are axially and radially secured in the supporting ring (7).

30. A device according to claim 29 wherein the sliding wedges (1) together with the outer joint part are displaceable by a pressure plate (4) connected to the calibrating mandrel (9).

31. A device according to claim 22 wherein the calibrating jaws (8) and the outer joint part are carried by an axially resilient counter punch (13).

32. A device according to claim 28 wherein on the supporting ring (7), there are provided holdingdown devices (12) which, in the lowest end position of the calibrating mandrel (9), can be moved towards, so as to engage, the end face of the outer joint part.

* * * * *